United States Patent Office.

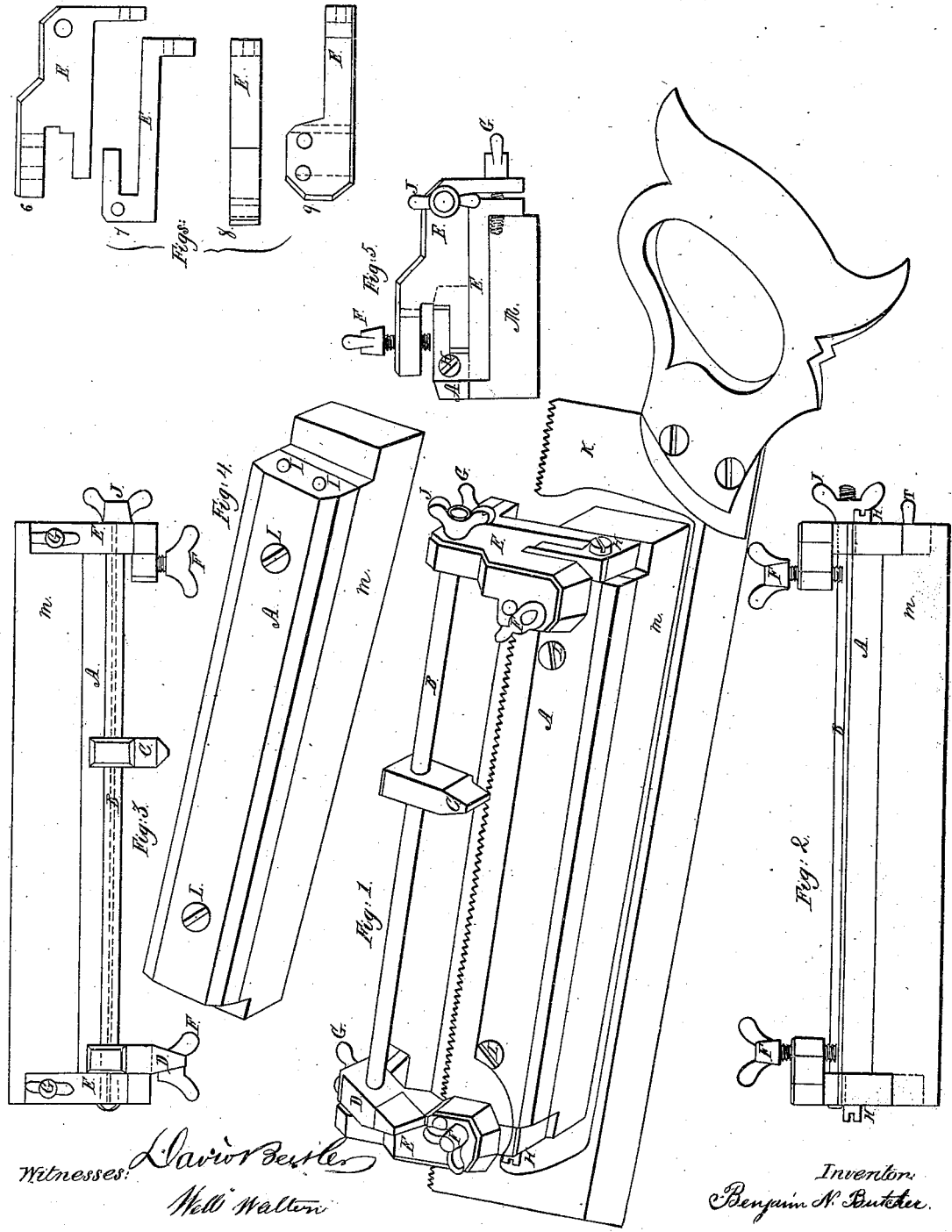

BENJAMIN N. BUTCHER, OF PHILADELPHIA, PENNSYLVANIA.

Letters Patent No. 64,835, dated May 21, 1867.

IMPROVEMENT IN SAW-SETS.

The Schedule referred to in these Letters Patent and making part of the same.

TO ALL WHOM IT MAY CONCERN:

Be it known that I, BENJAMIN N. BUTCHER, of Philadelphia, in the county of Philadelphia, State of Pennsylvania, have invented a new Mode of Giving the Set to the Teeth of Saws; and I do hereby declare that the following is a full and exact description thereof, reference being had to the accompanying drawings, and to the letters of reference marked thereon.

Figure 1 is a perspective view of the machine or tool, with a saw, K, placed in position to be set.

Figure 2 is a front elevation of the same without saw.

Figure 3 is a view looking at the back or rear of the machine or tool.

Figure 4 is a view in perspective of the bed-plate A or base, with the guides E, the mandrel B, and the sets C and D removed.

Figure 4 is an end elevation.

Figures 6, 7, 8, 9, are views of the guides E separated in detail.

A is the bed-piece, made of metal, and attached to the wooden block M. The top face is level, but has both edges bevelled off with different angles of inclination to the top face, so as to give a greater or less amount of set to the teeth of the saw. The bed-piece is shorter than the block M, so as to leave space at each end, to afford bearings for the frame-pieces or guides E', figs. 7 and 8, which are attached to the ends of bed-piece A by means of the screws H passing through the guide, and entering one or the other holes I, as the set may be intended to be adapted to either of the bevelled edges of the bed-plate A. The guide-piece E, shown in figs. 6 and 9, is adjustably confined on the piece E' by set-screws G sliding on its bearing parts, as may be required to fit the saw in place. When the saw is placed for setting it is clamped by the set-screws F passing through one or the other of the two openings in the top of the piece E. B is a rod, passing between the guides E, and parallel to the edge of the blade of the saw, and bearing the sets C and D, which are pointed and shaped as shown, to give the proper set to the saw-teeth, by laying the point of the set on the teeth, and striking it with a hammer.

What I claim as my invention, and desire to secure by Letters Patent, is—

The combination of the bed-plate A with bevelled edges of different angles of inclination, and the reversible and adjustable guide-pieces E and E', set-screws F and G, and sets C D, substantially as and for the purpose set forth.

BENJAMIN N. BUTCHER.

Witnesses:
DAVID BEITLER,
WELLS WATTEN.